(12) United States Patent
Murakami (10) Patent No.: US 7,990,590 B2
(45) Date of Patent: *Aug. 2, 2011

(54) IMAGE FORMING APPARATUS, IMAGE QUALITY CONTROL METHOD

(75) Inventor: Naoya Murakami, Kanagawa-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/749,287

(22) Filed: Mar. 29, 2010

(65) Prior Publication Data

US 2010/0182625 A1 Jul. 22, 2010

Related U.S. Application Data

(62) Division of application No. 11/865,277, filed on Oct. 1, 2007, now Pat. No. 7,733,547.

(51) Int. Cl.
*G06F 15/00* (2006.01)
*G03F 3/08* (2006.01)
(52) U.S. Cl. .......................................... 358/518; 358/1.9
(58) Field of Classification Search .................. 358/518, 358/1.9; 347/14, 19, 101
See application file for complete search history.

(56) References Cited

U.S. PATENT DOCUMENTS 5,787,331 A 7/1998 Ohkuma et al.
6,961,526 B2 11/2005 Tezuka et al.

FOREIGN PATENT DOCUMENTS

JP 2006-042002 2/2006

OTHER PUBLICATIONS

Office Action for U.S. Appl. No. 11/865,277 mailed on Aug. 11, 2009.

*Primary Examiner* — Charlotte M Baker
(74) *Attorney, Agent, or Firm* — Turocy & Watson, LLP (57) ABSTRACT

A technique that can perform appropriate image quality control processing corresponding to fluctuation in a printing environment is provided. An image forming apparatus that forms, on a sheet, a test pattern formed by a color obtained by mixing toners of plural colors, scans a test pattern image formed on the sheet with a color sensor, and performs predetermined image quality control processing on the basis of information scanned, the image forming apparatus including a media sensor that acquires information for discriminating a type of a sheet to be an object of image formation processing, a control-information acquiring unit that acquires, on the basis of the information acquired by the media sensor, information for control used in the image quality control processing, and a color sensor that is arranged further on a downstream side than a fixing device in a sheet conveying direction and scans the test pattern formed on the sheet.

12 Claims, 6 Drawing Sheets

IMAGE FORMING APPARATUS, IMAGE QUALITY CONTROL METHOD

CROSS-REFERENCE TO RELATED APPLICATIONS

This application is a Division of application Ser. No. 11/865,277 filed Oct. 1, 2007, the entire content of which is hereby incorporated by reference.

BACKGROUND OF THE INVENTION

1. Field of the Invention

The present invention relates to image quality control processing in an image forming apparatus, and, more particularly to improvement of accuracy of the image quality control processing.

2. Description of the Related Art

In an image forming apparatus such as a color MFP, a gray image area other than characters in an output image at the time of copy processing and print processing is often formed by mixing toners of four colors, yellow, magenta, cyan, and black. However, when the balance of toner quantities of the respective colors is collapsed because of influences of types of sheets onto which toner images are outputted, variation of the apparatus, and the like, this gray portion changes to a colored gray and is extremely deteriorated in appearance. Colors equal to or lower in order than so-called secondary colors such as R, G, and B may also change to colors with a color balance collapsed depending on types of output sheets because of a problem of transferability and the like. When the color balance is collapsed in this way, conventionally, the color balance is adjusted using functions such as color balance adjustment.

However, since the color balance adjustment is manual adjustment, the color balance adjustment takes time. Even if the color balance is adjusted with effort, when a printer gamma characteristic fluctuates because of aged deterioration and the like, the adjustment has to be performed again every time the fluctuation occurs. Therefore, the control is extremely complicated.

Moreover, even if the adjustment of the color balance is performed as described above, since a type of a sheet as a recording medium is changed commonly, in the conventional color balance adjustment method, it is practically difficult to accurately perform the adjustment of the color balance according to various situations.

SUMMARY OF THE INVENTION

It is an object of an embodiment of the invention to provide a technique that can perform appropriate image quality control processing corresponding to fluctuation in a printing environment.

In order to solve the problems described above, an image forming apparatus according to an aspect of the invention is an image forming apparatus that forms, on a sheet, a test pattern formed by a color obtained by mixing toners of plural colors, scans a test pattern image formed on the sheet with a color sensor, and performs predetermined image quality control processing on the basis of information scanned. The image forming apparatus is characterized by including a sheet-information acquiring unit that acquires information for discriminating a type of a sheet to be an object of image formation processing, a control-information acquiring unit that acquires, on the basis of the information acquired by the sheet-information acquiring unit, information for control used in the image quality control processing, and a color sensor that is arranged further on a downstream side than a fixing device in a sheet conveying direction and scans the test pattern formed on the sheet.

An image forming apparatus according to another aspect of the invention is characterized by including a sheet-information acquiring unit that acquires information for discriminating a type of a sheet to be an object of image formation processing and a control-information acquiring unit that acquires, on the basis of the information acquired by the sheet-information acquiring unit, information for control used in the image quality control processing.

An image forming apparatus according to still another aspect of the invention is characterized by including sheet-information acquiring means for acquiring information for discriminating a type of a sheet to be an object of image formation processing and control-information acquiring means for acquiring, on the basis of the information acquired by the sheet-information acquiring means, information for control used in the image quality control processing.

An image quality control method according to still another aspect of the invention is characterized by including a sheet-information acquiring step of acquiring information for discriminating a type of a sheet to be an object of image formation processing and a control-information acquiring step of acquiring, on the basis of the information acquired in the sheet-information acquiring step, information for control used in the image quality control processing.

DESCRIPTION OF THE EMBODIMENTS

Embodiments of the invention will be hereinafter explained with reference to the drawings.

First Embodiment

First, a first embodiment of the invention will be explained.

Figure 1:
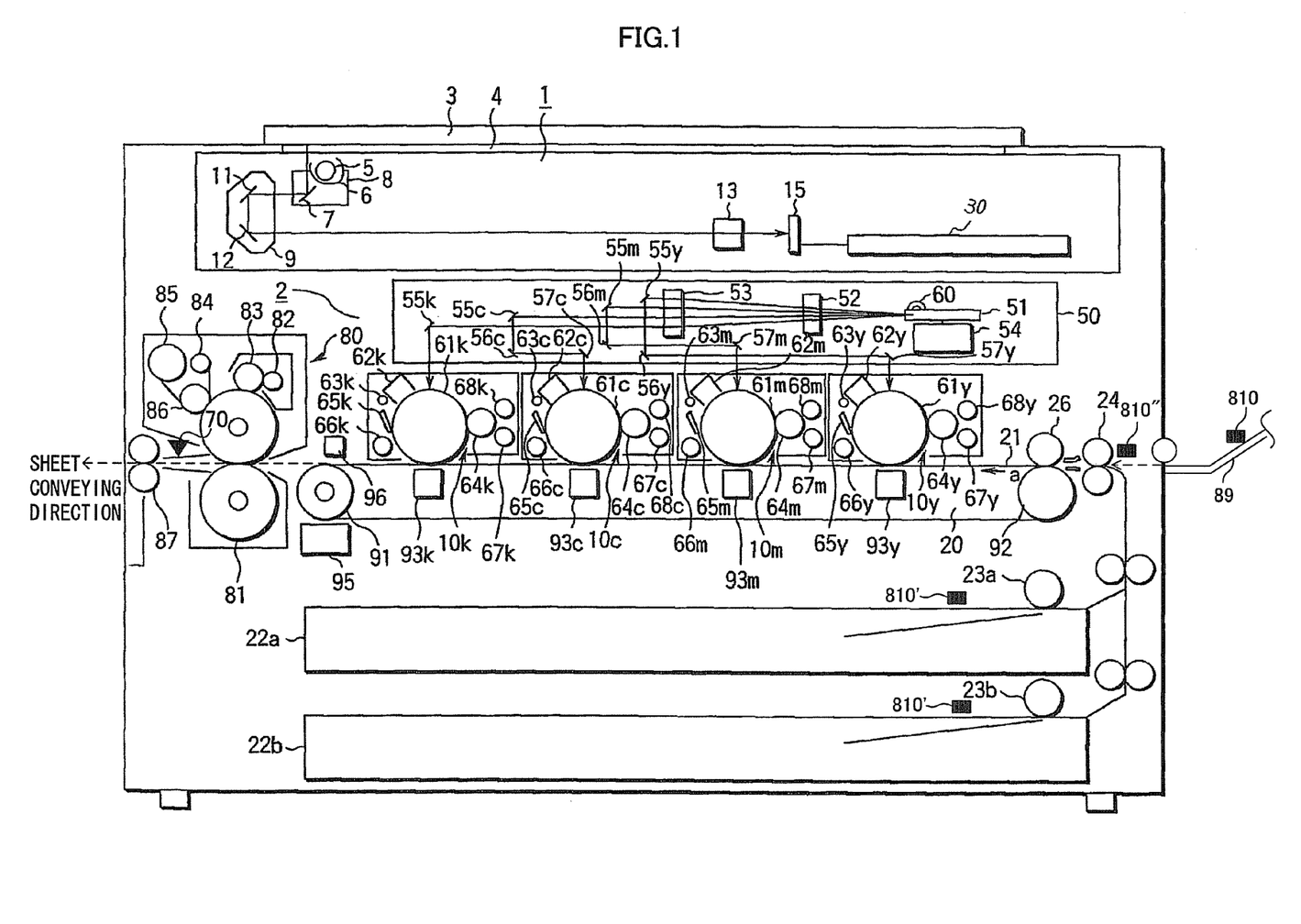
FIG. 1 is a diagram schematically showing an internal structure of an image forming apparatus such as a digital color copying machine that forms a copy image of a color image according to a first embodiment of the invention.

FIG. 1 schematically shows an internal structure of an image forming apparatus such as a digital color copying machine that forms a copy image of a color image according to a first embodiment of the invention. This image forming apparatus is roughly constituted by a color scanner unit 1 as image scanning means for scanning a color image on an original and a color printer unit 2 as image forming means for forming a copy image of the color image scanned.

The color scanner unit 1 has an original stand 4 made of transparent glass that has an original stand cover 3 in an upper part thereof and is disposed to be opposed to the original stand cover 3 in a closed state and on which an original is set. Below the original stand 4, an exposure lamp 5 that lights an original placed on the original stand 4, a reflector 6 for condensing light from the exposure lamp 5 onto the original, a first mirror 7 that bends reflected light from the original in a left direction with respect to the drawing, and the like are disposed. The exposure lamp 5, the reflector 6, and the first mirror 7 are fixed to a first carriage 8. The first carriage 8 is driven by a not-shown pulse motor to be translated along a lower surface of the original stand 4.

On the left side in the figure with respect to the first carriage 8, i.e., in a direction in which light reflected by the first mirror 7 is guided, a second carriage 9 provided to be movable in parallel to the original stand 4 via a not-shown driving mechanism (e.g., a toothed belt and a DC motor) is disposed. In the second carriage 9, a second mirror 11 that bends the reflected light from the original guided by the first mirror 7 downward in the figure and a third mirror 12 that bends the reflected light from the second mirror 11 in the right direction in the figure are arranged at a right angle to each other. The second carriage 9 is driven by the first carriage 8 and translated along the original stand 4 at a speed half of that of the first carriage 8.

In a plane including an optical axis of the light returned by the second and the third mirrors 11 and 12, a focusing lens 13 that focuses the reflected light from the third mirror 12 at a predetermined magnification is arranged. In a plane substantially orthogonal to the optical axis of the light transmitted through the focusing lens 13, a CCD color image sensor (a photoelectric conversion element) 15 that converts the reflected light imparted with a focusing property by the focusing lens 13 into an electric signal is disposed.

When the light from the exposure lamp 5 is condensed onto the original on the original stand 4 by the reflector 6, reflected light from the original is made incident on the color image sensor 15 via the first mirror 7, the second mirror 11, the third mirror 12, and the focusing lens 13. In the color image sensor 15, the incident light is converted into electric signals corresponding to three primary colors of light, i.e., R (red), G (green), and B (blue).

The color printer unit 2 has first to fourth image forming units 10y, 10m, 10c, and 10k that form images subjected to color separation for each of color components on the basis of the well-known subtractive color mixture process, i.e., images of four colors of yellow (y), magenta (m), cyan (c), and black (k).

Below the respective image forming units 10y, 10m, 10c, and 10k, a conveying mechanism 20 including a conveyor belt 21 as conveying means for conveying the images of the respective colors formed by the respective image forming units in an arrow "a" direction in the figure is disposed. The conveyor belt 21 is wound around and tensed between a driving roller 91 rotated in the arrow "a" direction by a not-shown motor and a driven roller 92 spaced a predetermined distance apart from the driving roller 91. The conveyor belt 21 is caused to endlessly travel in the arrow "a" direction at a constant speed. The respective image forming units 10y, 10m, 10c, and 10k are disposed in series along the conveying direction of the conveyor belt 21.

The respective image forming units 10y, 10m, 10c, and 10k include photoconductive drums 61y, 61m, 61c, and 61k as image bearing members, outer peripheral surfaces of which are formed to be rotatable in an identical direction in positions in contact with the conveyor belt 21, respectively. The respective photoconductive drums 61y, 61m, 61c, and 61k are driven at a predetermined speed by a not-shown motor.

The respective photoconductive drums 61y, 61m, 61c, and 61k are disposed such that axes thereof are set at equal intervals from one another. The axes are disposed to be orthogonal to the direction in which the images are conveyed by the conveyor belt 21. In the following explanation, an axial direction of the respective photoconductive drums 61y, 61m, 61c, and 61k is set as a main scanning direction (a second direction) and a rotating direction of the photoconductive drums 61y, 61m, 61c, and 61k, i.e., a rotating direction of the conveyor belt 21 (the arrow "a" direction in the figure) is set as a sub-scanning direction (a first direction).

Around the respective photoconductive drums 61y, 61m, 61c, and 61k, charging devices 62y, 62m, 62c, and 62k as charging means extended in the main scanning direction, charge removing devices 63y, 63m, 63c, and 63k, developing rollers 64y, 64m, 64c, and 64k as developing means also extended in the main scanning direction, lower agitating rollers 67y, 67m, 67c, and 67k, upper agitating rollers 68y, 68m, 68c, and 68k, transferring devices 93y, 93m, 93c, and 93k as transferring means also extended in the main scanning direction, cleaning blades 65y, 65m, 65c, and 65k also extended in the main scanning direction, and waste-toner collecting screws 66y, 66m, 66c, and 66k are arranged in order along the rotating direction of the photoconductive drums 61y, 61m, 61c, and 61k, respectively.

The respective transferring devices 93y, 93m, 93c, and 93k are disposed in positions for holding the conveyor belt 21 between the transferring devices 93y, 93m, 93c, and 93k and the photoconductive drums 61y, 61m, 61c, and 61k corresponding thereto, i.e., on the inner side of the conveyor belt 21. Exposure points formed by an exposing device 50 described later are formed on the outer peripheral surfaces of the photoconductive drums 61y, 61m, 61c, and 61k between the charging devices 62y, 62m, 62c, and 62k and the developing rollers 64y, 64m, 64c, and 64k, respectively.

Below the conveying mechanism 20, sheet feeding cassettes 22a and 22b that store plural sheets P as image forming media, onto which images formed by the respective image forming units 10y, 10m, 10c, and 10k are transferred, are arranged.

At one end of the sheet feeding cassettes 22a and 22b and on a side close to the driven roller 92, pickup rollers 23a and 23b that take out the sheets P stored in the sheet feeding cassettes 22a and 22b from the top thereof one by one are arranged. Between the pickup rollers 23a and 23b and the driven roller 92, registration rollers 24 for aligning a leading end of the sheet P taken out from the sheet cassette 22a or 22b and a leading end of a yellow toner image formed on the photoconductive drum 61y of the image forming unit lay are arranged. On the right side in FIG. 1 of a housing of the image forming apparatus according to this embodiment, a manual feed tray 89 that makes it possible to feed special paper such as backing paper and a long sheet is provided.

In the manual feed tray 89, a media sensor 810 for detecting a type and the like of a sheet (a sheet to be an object of image formation processing) set in the manual feed tray 89 is provided. It is possible to provide the media sensor 801 not only in the manual feed tray 89 but also in the sheet feeding cassettes 22a and 22b (see media sensors 801' shown in FIG. 1). In other words, it is preferable that the media sensor 801 is arranged on a conveying path for a sheet on which a toner image is formed and in a position where a temporal margin enough for performing predetermined image quality control processing can be secured from the time when a type of a sheet is detected until image formation processing for the sheet is performed. The media sensor 801 does not always have to be arranged in the manual feed tray or the sheet feeding cassettes as long as the above conditions are satisfied. For example, it is also possible to reduce the number of arranged media sensors by arranging the media sensors in positions where all sheets fed from the manual feed tray and the sheet feeding cassettes pass (see the media sensors 801' shown in FIG. 1).

Toner images formed on the other photoconductive drums 61y, 61m, and 61c are supplied to respective transfer positions to be timed to coincide with conveyance timing of the sheets P conveyed on the conveyor belt 21.

Between the registration rollers 24 and the first image forming unit by and near the driven roller 92, i.e., substantially on the outer periphery of the driven roller 92 across the transfer belt 21, an attracting roller 26 for giving an electrostatic attracting force to the sheet P conveyed at predetermined timing via the registration rollers 24 is disposed. An axis of the attracting roller 26 and an axis of the driven roller 92 are set to be parallel to each other.

At one end of the conveyor belt 21 and near the driving roller 91, i.e., substantially on the outer periphery of the driving roller 91 across the conveyor belt 21, a positional deviation sensor 96 for detecting a position of an image formed on the conveyor belt 21 is disposed.

The positional deviation sensor 96 is constituted by, for example, a transmission or reflection optical sensor.

On the outer periphery of the driving roller 91 and on the conveyor belt 21 on a downstream side of the positional deviation sensor 96, a conveyor-belt cleaning device 95 for removing a toner adhering on the conveyor belt 21, paper dust of the sheet P, or the like is arranged.

In a direction in which the sheet P conveyed via the conveyor belt 21 is separated from the driving roller 91 and further conveyed, a fixing device 80 that melts a toner image transferred on the sheet P by heating the sheet P to a predetermined temperature and fixes the toner image on the sheet P is disposed. The fixing device 80 is constituted by a heat roller pair 81, oil applying rollers 82 and 83, a web winding roller 84, a web roller 85, and a web pressing roller 86. Further on the downstream side than the fixing device 80 in the sheet conveying direction, a color sensor 70 for optically scanning an image (in particular, a test pattern image described later) formed on a sheet is arranged. The sheet P having the toner image heated and fixed thereon in the fixing device 80 is discharged by a paper discharge roller pair 87.

The exposing device 50 that forms electrostatic latent images subjected to color separation on the outer peripheral surfaces of the photoconductive drums 61y, 61m, 61c, and 61k, respectively, has a semiconductor laser oscillator 60 controlled to emit light on the basis of image data (Y, M, C, K) of the respective colors subjected to color separation by an image processing unit 36 that performs predetermined image quality control processing and the like. On an optical path of the semiconductor laser oscillator 60, a polygon mirror 51 that reflects and scans laser beams and is rotated by a polygon motor 54 and fθ lenses 52 and 53 for correcting a focus of the laser beams reflected via the polygon mirror 51 and focusing the laser beams are provided in order.

Between the fθ lens 53 and the respective photoconductive drums 61y, 61m, 61c, and 61k, first return mirrors 55y, 55m, 55c, and 55k that bend the laser beams of the respective colors transmitted through the fθ lens 53 to exposure positions of the respective photoconductive drums 61y, 61m, 61c, and 61k and second and third return mirrors 56y, 56m, 56c, 57y, 57m, and 57c that further bend the laser beams bent by the first return mirrors 55y, 55m, and 55c are arranged.

The laser beam for black is returned by the first return mirror 55k and then guided onto the photoconductive drum 61k without being bent by the other mirrors.

Figure 2:
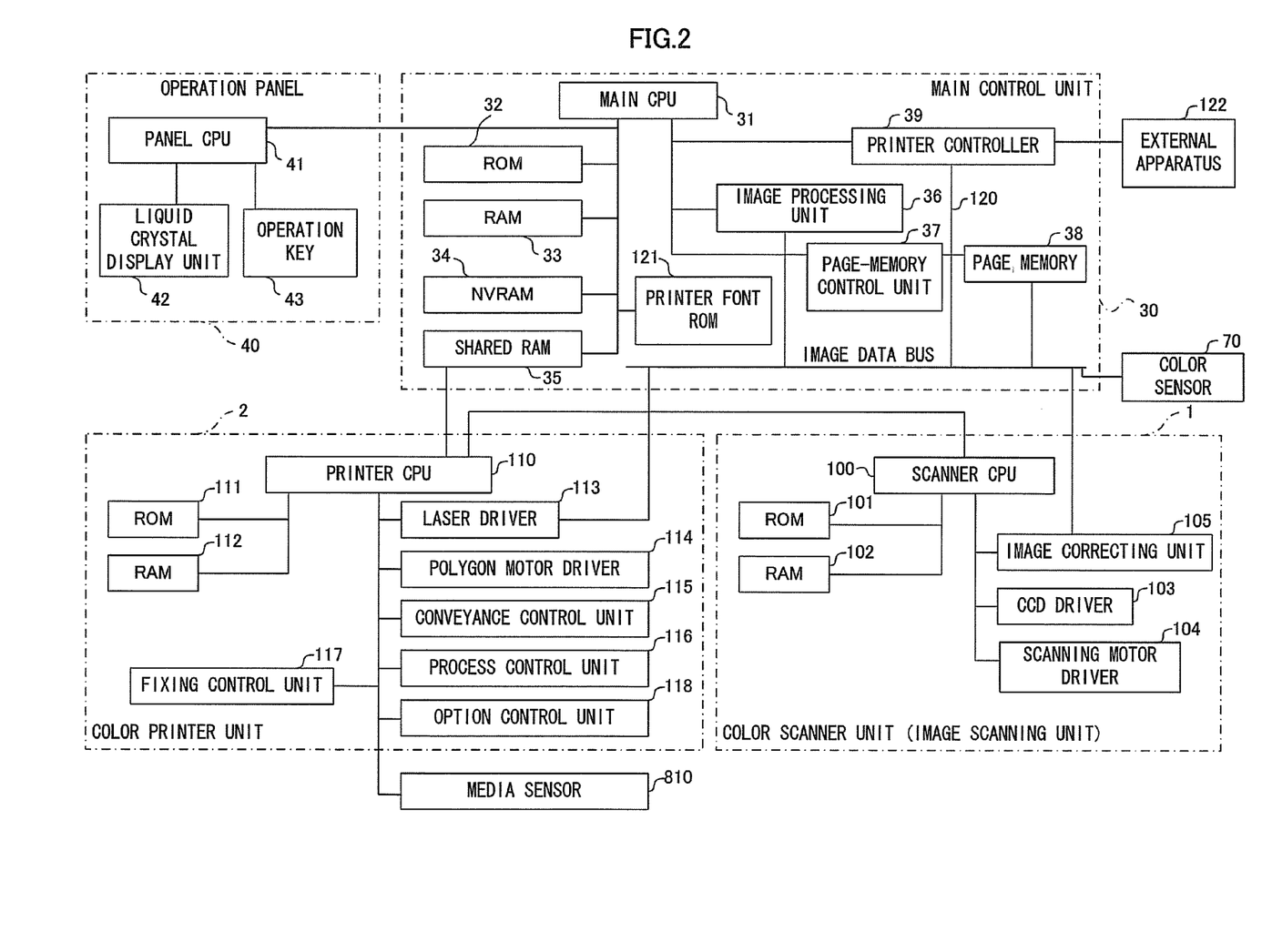
FIG. 2 is a block diagram schematically showing electrical connection and a flow of a signal for control of the digital copying machine shown in FIG. 1.

FIG. 2 shows a block diagram schematically showing electrical connection and a flow of a signal for control of the digital copying machine shown in FIG. 1. In FIG. 2, a control system is constituted by three CPUs, namely, a main CPU (Central Processing Unit) 91 in a main control unit 30, a scanner CPU 100 of the color scanner unit 1, and a printer CPU 110 of the color printer unit 2.

The main CPU 31 performs bi-directional communication with the printer CPU 110 via a shared RAM (Random Access Memory) 35. The main CPU 31 issues an operation instruction and the printer CPU 110 returns a status. The printer CPU 110 and the scanner CPU 100 perform serial communication. The printer CPU 110 issues an operation instruction and the scanner CPU 100 returns a status.

An operation panel 40 has a liquid crystal display unit 42, various operation keys 43, and a panel CPU 41 connected to the liquid crystal display unit 42 and the operation keys 43. The operation panel 40 is connected to the main CPU 31.

The main control unit 30 is constituted by the main CPU 31, a ROM (Read Only Memory) 32, a RAM 33, an NVRAM 34, a shared RAM 35, an image processing unit 36, a page-memory control unit 37, a page memory 38, a printer controller 39, and a printer font ROM 121.

The main CPU 31 manages overall control. The ROM 32 has a control program and the like stored therein. The RAM 33 temporarily stores data.

The NVRAM (nonvolatile Random Access Memory: nonvolatile RAM) 34 is a nonvolatile memory backed up by a battery (not shown) and holds stored data even if a power supply is isolated.

The shared RAM 35 is used for performing bi-directional communication between the main CPU 31 and the printer CPU 110.

The page-memory control unit 37 stores image information in and reads out the image information from the page memory 38. The page memory 38 has an area that can store image information for plural pages. The page memory 38 is formed to be capable of storing, for each page, data obtained by compressing image information from the color scanner unit 1.

Font data corresponding to print data is stored in the printer font ROM 121. The printer controller 39 expands printer data from an external apparatus 122 such as a personal computer into image data at a resolution corresponding to data indicating a resolution given to the print data using the font data stored in the printer font ROM 121.

The color scanner unit 1 is constituted by the scanner CPU 100 that manages overall control, a ROM 101 having a control program and the like stored therein, a RAM 102 for data storage, a CCD driver 103 that drives the color image sensor 15, a scanning motor driver 104 that controls rotation of a scanning motor for moving the first carriage 8 and the like, an image correcting unit 105, and the like.

The image correcting unit 105 is constituted by an A/D conversion circuit that converts analog signals of R, G, and B outputted from the color image sensor 15 into digital signals, respectively, a shading correction circuit for correcting fluctuation in a threshold level with respect to the output signals from the color image sensor 15 due to variation of the color image sensor 15, ambient temperature change, and the like, a line memory that temporarily stores the digital signals subjected to shading correction from the shading correction circuit, and the like.

The color printer unit 2 is constituted by the printer CPU 110 that manages overall control, a ROM 111 having a control program and the like stored therein, a RAM 112 for data storage, a laser driver 113 that drives the semiconductor laser oscillator 60, a polygon motor driver 114 that drives the polygon motor 54 of the exposing device 50, a conveyance control unit 115 that controls conveyance of the sheet P by the conveying mechanism 20, a process control unit 116 that controls processes for performing charging, development, and transfer using the charging devices, the developing rollers, and the transferring devices, a fixing control unit 117 that controls the fixing device 80, an option control unit 118 that controls options, and the like.

The image processing unit 36, the page memory 38, the printer controller 39, the image correcting unit 105, and the laser driver 113 are connected by an image data bus 120.

Figure 3:
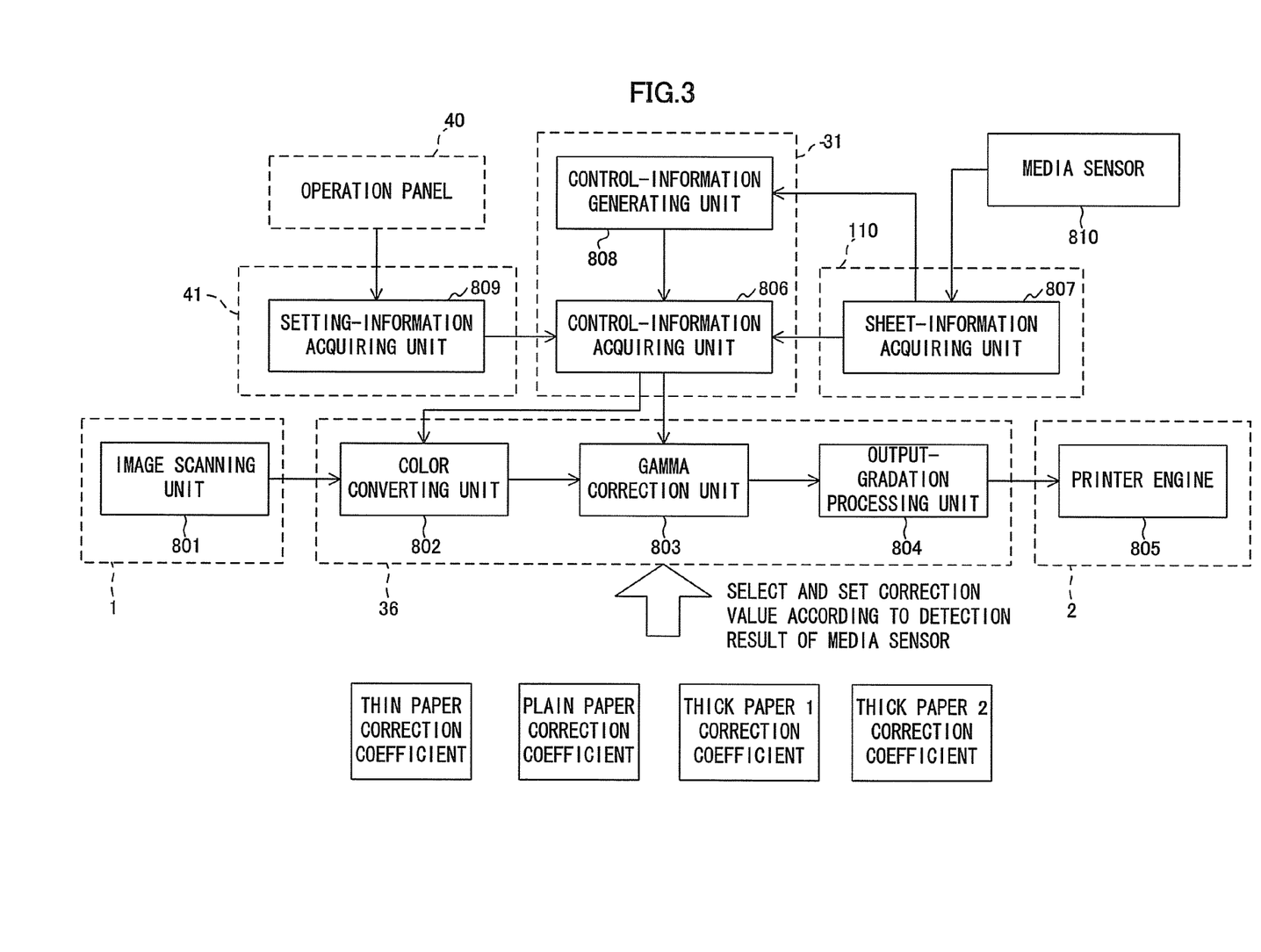
FIG. 3 is a functional block diagram of the image forming apparatus according to the embodiment.

FIG. 3 is a diagram showing functional blocks of the image forming apparatus according to this embodiment. The image forming apparatus according to this embodiment forms, on a sheet, a test pattern formed by a color obtained by mixing toners of plural colors, scans the test pattern formed on the sheet with a color sensor, and performs predetermined image quality control on the basis of information scanned.

As shown in the figure, the image forming apparatus according to this embodiment includes, an image scanning unit 801, a color converting unit 802, a gamma correction unit 803, output gradation processing unit 804, a printer engine 805, a control-information acquiring unit 806, a sheet-information acquiring unit 807, a control-information generating unit 808, and a setting-information acquiring unit 809.

The image scanning unit 801 is equivalent to the color scanner unit 1, the color converting unit 802, the gamma correction unit 803, and the output-gradation processing unit 804 are equivalent to the image processing unit 36, the printer engine 805 is equivalent to the color printer unit 2, the control-information acquiring unit 806 and the control-information generating unit 808 are equivalent to the main CPU 31, the sheet-information acquiring unit 807 is equivalent to the printer CPU 110, and the setting-information acquiring unit 809 is equivalent to the panel CPU 41.

The image scanning unit 801 is equivalent to the color sensor 70 or the color scanner unit 1. The color converting unit 802 performs predetermined color conversion processing. The gamma correction unit 803 performs processing for correcting a gamma characteristic (an image forming characteristic) (equivalent to predetermined image quality control processing) in the image forming apparatus. Image data subjected to the gamma correction by the gamma correction unit 803 is outputted to the printer engine 805 (the color printer unit 2) through the output-gradation processing unit 804.

The sheet-information acquiring unit 807 acquires information for discriminating a type of a sheet to be an object of image formation processing (smoothness of a sheet surface, a reflectance of the sheet surface, an electric resistance of the sheet, thickness of the sheet, a base color of the sheet, etc.) from the media sensor 810 and the like. Information acquired by the media sensor 810 is transmitted to the printer CPU 110.

The setting-information acquiring unit 809 acquires, from a predetermined memory area (e.g., the ROM 32 is adopted. Besides, it is possible to adopt the RAM 33, the ROM 101, the RAM 102, the ROM 111, the RAM 112, the NVRAM 34, the shared RAM 35, and the like as the predetermined memory area), setting information that is set concerning which of information acquired by the sheet-information acquiring unit 807 and information acquired by the operation panel 40 is given priority.

The control-information generating unit 808 generates information for control on the basis of the information acquired by the sheet-information acquiring unit 807 and predetermined information for generation. By calculating (generating) the information for control on the basis of the information for generation such as a coefficient and a function, it is possible to generate various kinds of information for control corresponding to types of sheets while holding down a storage capacity.

The main CPU 31 acquires information for control used for image quality control processing (e.g., a table for correction used for gamma correction) on the basis of the information acquired by the sheet-information acquiring unit 807.

The control-information acquiring unit 806 acquires from the memory area a table for control corresponding to the sheet, the information of which is acquired, on the basis of the information acquired by the sheet-information acquiring unit 807 when at least one of the smoothness of the surface, a material, and the base color of the sheet, the information of which is acquired, is different from that of a set sheet (that is, when the gradation characteristics of a sheet to be used vary largely). Here, an example in which the information for control is the table for control is described. However, the information for control is not limited to this. The information for control may be, for example, a "calculation function" for performing a numerical operation.

The control-information acquiring unit 806 can acquire the information for control used in the image quality control processing on the basis of not only information on detection by the media sensor 810 but also input information received by the operation panel 40, information detected by a temperature sensor and a humidity sensor, and the like.

The control-information acquiring unit 806 acquires, when the information for discriminating a type of a sheet is received by the operation panel 40, the information for control used in the image quality control processing on the basis of the information acquired by one of the sheet-information acquiring unit 807 and the operation panel 40 that is set to be given priority according to the setting information acquired by the setting-information acquiring unit 809. Consequently, for example, when information of a sheet acquired by the sheet-information acquiring unit and information of a sheet manually inputted are different, it is possible to perform the image quality control processing with priority given to one of these kinds of information according to contents of a prior setting. Specifically, it is possible to give priority to contents of manual input, for example, when a special sheet (e.g., a long sheet), detection of which is difficult with the media sensor, is used.

Details of the processing in the image forming apparatus according to this embodiment will be explained.

First, correction coefficients for performing correction of colors (gradation characteristics) are determined using the color sensor 70 for a standard output sheet as a reference determined in advance.

Figure 4:
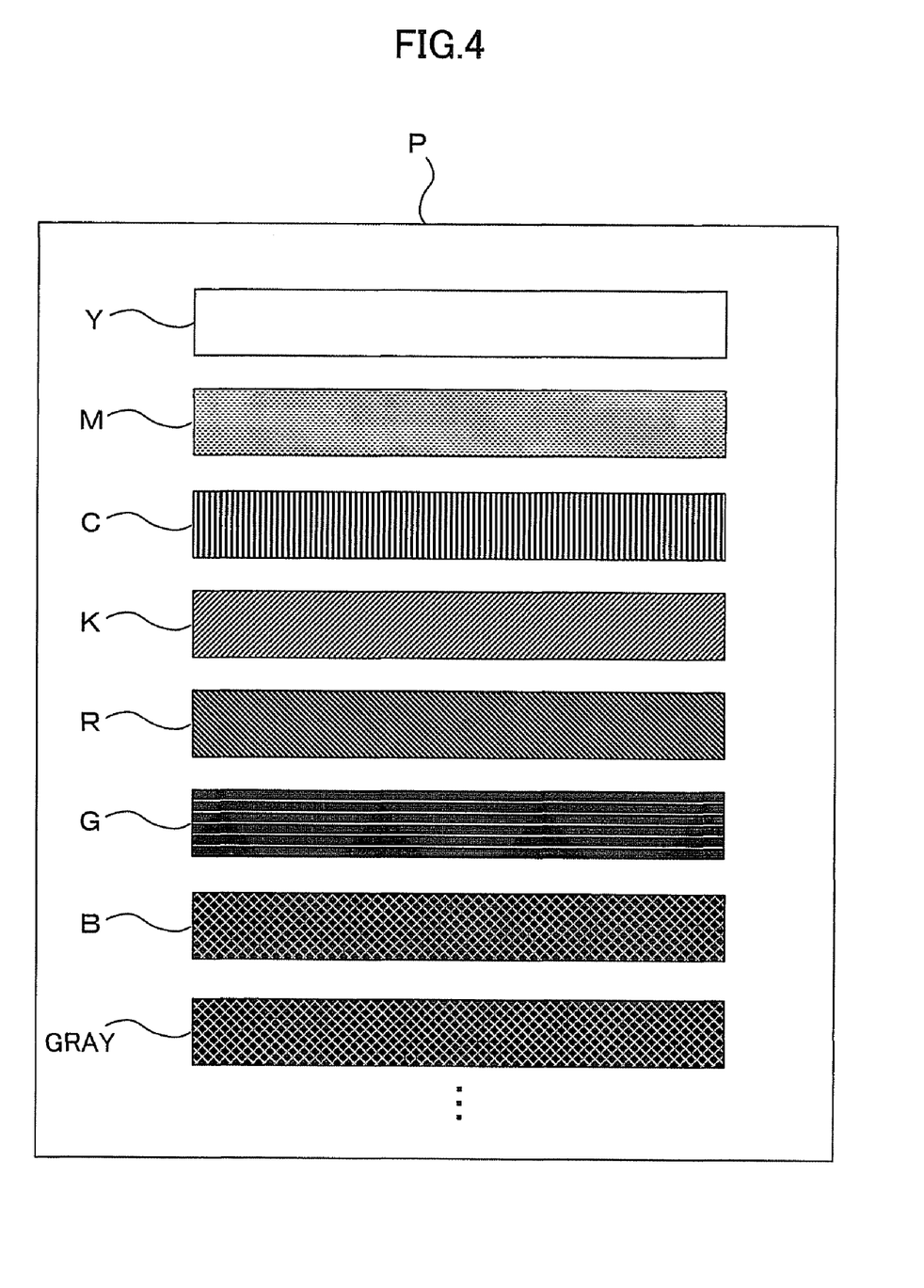
FIG. 4 is a diagram showing an example of a test pattern formed on a sheet.

A test pattern is generated in the image forming apparatus and the test pattern formed on a sheet is scanned by the color sensor 70 to determine correction coefficients. FIG. 4 is a diagram showing an example of the test pattern formed on the sheet.

On the basis of a result of detection by the color sensor 70, an amount of exposure and process conditions in the image forming apparatus, a "color conversion table" and a "gamma correction table" for converting RGB signals in the image processing units into color reproduction areas of a color image forming apparatus (converting RGB signals into CMYK signals), correction coefficients, and the like are calculated, or table values and the like are acquired, and stored in a predetermined memory area.

Subsequently, correction coefficients of colors (gradation characteristics) are calculated for each of various sheets with different thicknesses (thin paper, thick paper 1 thick paper 2, coat paper, etc.), which are recommended sheets, and stored in the predetermined memory area (see FIG. 5 described later).

When a user outputs an image to an arbitrary output sheet, if it is determined that a property of gradation characteristics of the sheet (color reproducibility by a toner) substantially changes on the basis of an indication of thick paper by the user instruction or the detection result by the media sensor 801, the correction coefficients are switched and color (output gradation) characteristics of the output image formed on the sheet are corrected using the correction coefficients (information for control) switched.

Second Embodiment

A second embodiment of the invention will be explained.

This embodiment is a modification of the first embodiment described above. In the following explanation, components same as those already described in the first embodiment are denoted by the identical reference numerals and signs and explanations of the components are omitted.

When a user outputs an image to an arbitrary output sheet, if an indication of thick paper by a user instruction or a sheet detected by the media sensor 801 is different from a defined recommended sheet, correction coefficients adjusted to the output sheet are calculated. The correction coefficients in this context are obtained by causing an image forming apparatus to output a test pattern and recalculating correction coefficients. Consequently, it is possible to determine color (gradation characteristics) correction coefficients corresponding to the thickness of the sheet and appropriately correct color (output gradation) characteristics of an output image.

Third Embodiment

A third embodiment of the invention will be explained.

This embodiment is a modification of the first embodiment described above. In the following explanation, components same as those already described in the first embodiment are denoted by the identical reference numerals and signs and explanations of the components are omitted.

Figure 5:
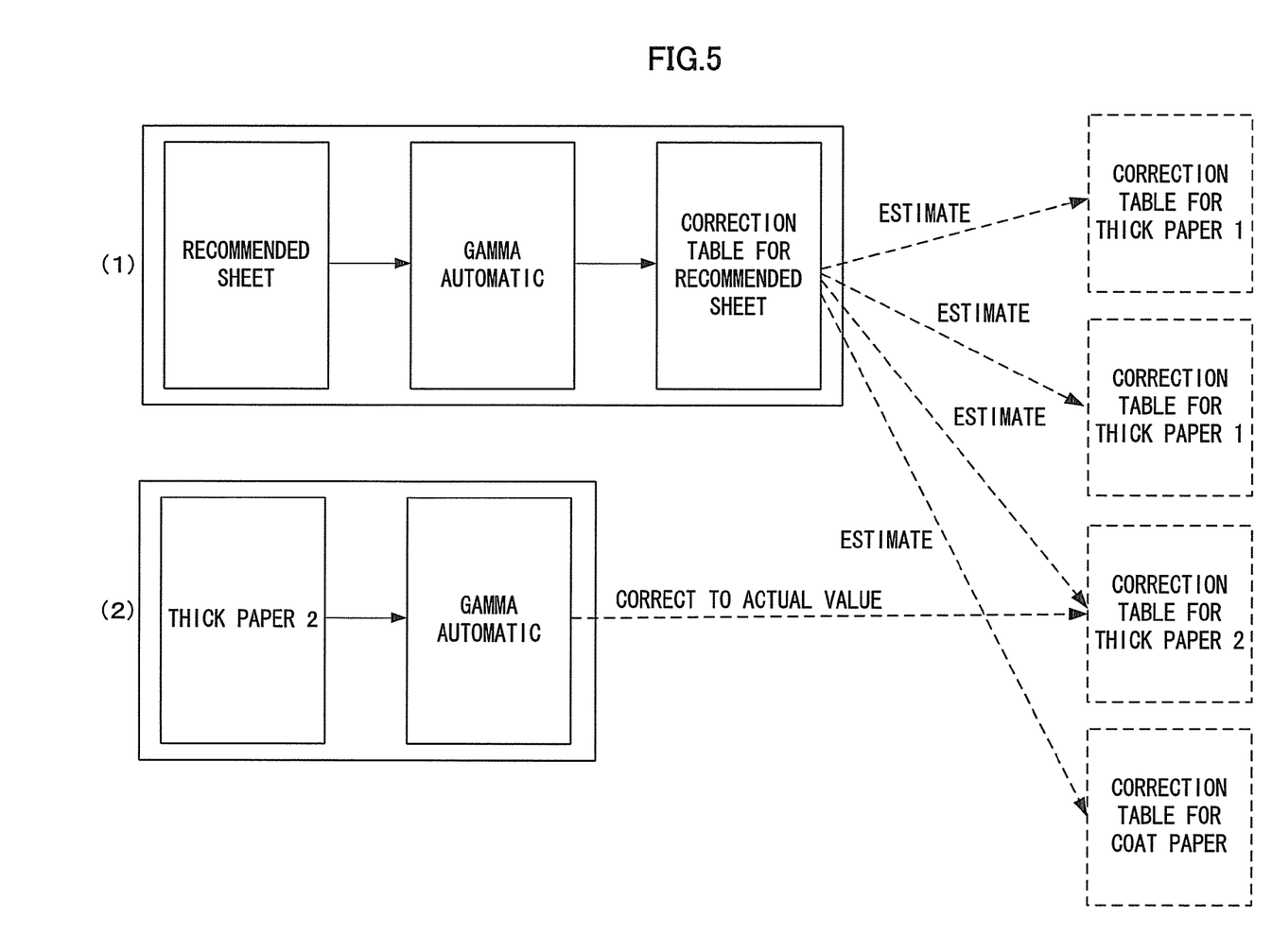
FIG. 5 is a conceptual diagram for explaining a method of correcting information for control in the embodiment.

FIG. 5 is a conceptual diagram for explaining a method of generating information for control in this embodiment.

First, in this embodiment, gamma automatic control is applied to recommended sheets to calculate a recommendation table. Then, as in the embodiment described above, correction tables of sheets such as "thick paper" and "coat paper" in the case in which the sheets are the recommended sheets are estimated on the basis of correction tables of the recommended sheets. Estimation processing in this context is performed by calculating, using a coefficient, a function, and the like, a correction table corresponding to a sheet as an object with respect to a correction table of a sheet as a reference.

The processing is effective because it is possible to generate a correction table even if there is no "thick paper" and "coat paper" actually. For example, when it is possible to actually perform gamma automatic control processing for the "thick paper 1", by replacing a correction table obtained by the automatic control with a correction table estimated for the thick paper 1, it is possible to obtain a correction table accurately reflecting a state of sheets and contribute to improvement of accuracy of image quality control processing corresponding to various recording media.

Figure 6:
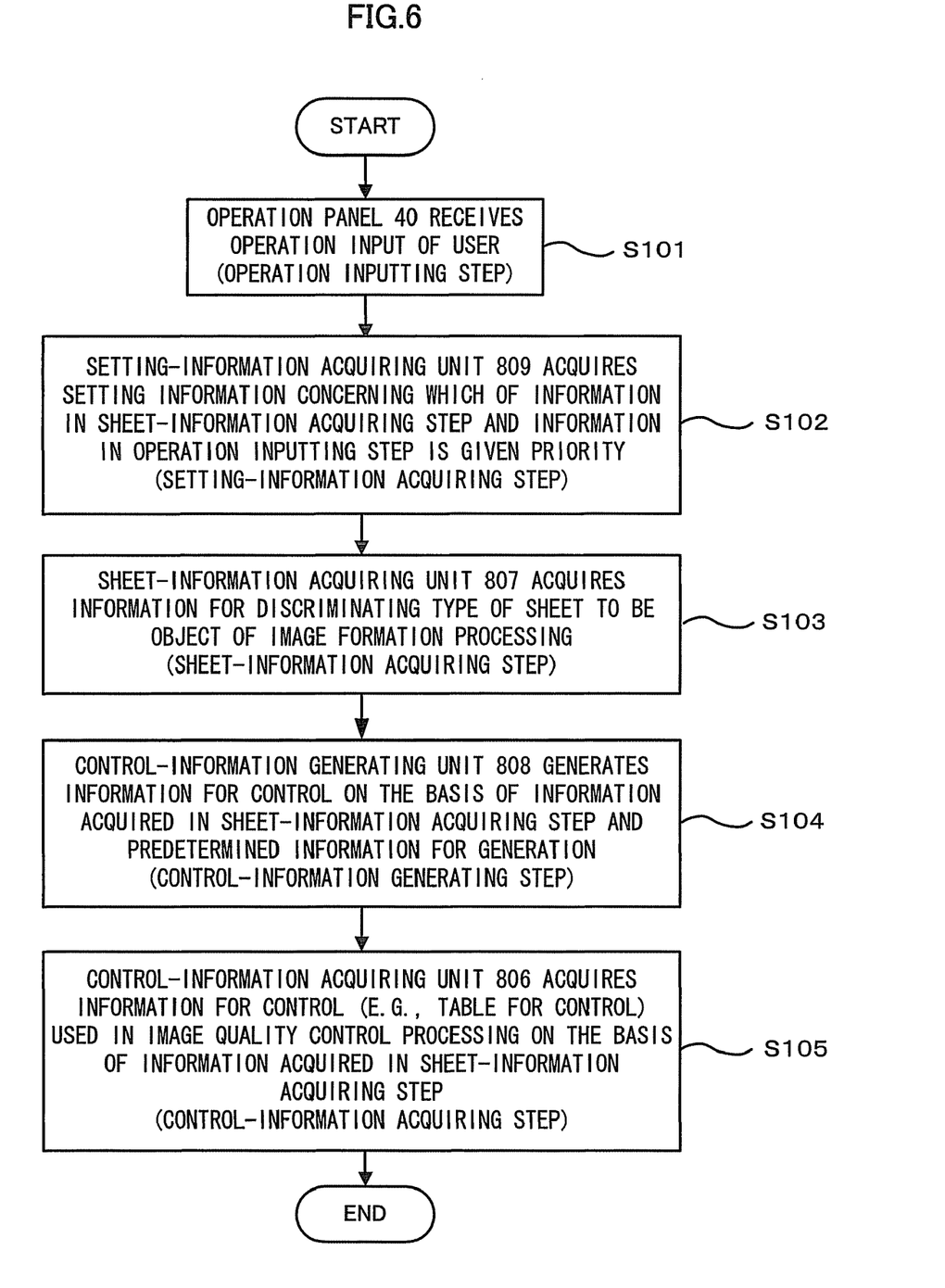
FIG. 6 is a flowchart for explaining a rough flow of processing (an image quality control method) in the image forming apparatus according to the embodiment described above.

FIG. 6 is a flowchart for explaining a rough flow of processing (an image quality control method) in the image forming apparatus according to the embodiment described above.

The operation panel 40 receives an operation input of the user (an operation inputting step) (S101).

The panel CPU 41 acquires, from the operation panel 40, setting information concerning which of information in a sheet-information acquiring step and information in the operation inputting step is given priority (a setting-information acquiring step) (S102).

The printer CPU 110 acquires information for discriminating a type of a sheet to be an object of image formation processing (the sheet-information acquiring step) (S103).

The main CPU 31 generates information for control on the basis of the information acquired in the sheet-information acquiring step and predetermined information for generation (a control-information generating step) (S104).

The main CPU 31 acquires information for control (e.g., a table for control) used for image quality control processing on the basis of the information acquired in the sheet-information acquiring step (a control-information acquiring step) (S105).

In the control-information acquiring step, a table for control corresponding to the sheet, the information of which is acquired, is acquired on the basis of the information acquired in the sheet-information acquiring step when at least one of smoothness of the surface, a material, and a base color of the sheet, the information of which is acquired, is different from that of a set sheet.

In the control-information acquiring step, the information for control used in the image quality control processing is acquired on the basis of input information received in the operation inputting step.

It is preferable that, in the control-information acquiring step, when information for discriminating a type of a sheet is received in the operation inputting step, the information for control used in the image quality control processing is acquired on the basis of the information acquired in one of the sheet-information acquiring step and the operation inputting step that is set to be given priority according to the setting information acquired in the setting-information acquiring step.

As described above in this embodiment, it is desirable that gamma correction for gradation characteristics is performed using a recommended sheet as a reference and, for other kinds of sheets, correction tables are obtained by calculation. Coefficients and the like set in advance are used when a sheet to be used is a recommended sheet. When the sheet is changed to another sheet, the image forming apparatus is caused to output a test pattern in order to calculate a coefficient. In this way, the gradation characteristics are changed to gradation characteristics adjusted to the sheet.

The respective steps in the processing (the image quality control method) in the image forming apparatus described above are realized by causing the CPUs (the main CPU 31, the panel CPU 41, the scanner CPU 100, and the printer CPU 110) to execute an image quality control program stored in the memories (the ROM 32, the RAM 33, the ROM 101, the RAM 102, the ROM 111, the RAM 112, the NVRAM 34, and the shared RAM 35).

In the embodiments described above, the example is cited in which the predetermined image quality control processing is the gamma correction processing. However, the invention is not limited to this. It is possible to apply the invention to image quality control processing as long as it is necessary change processing contents according to a type of a recording medium in the image quality control processing.

In the embodiments described above, the example is cited in which the recording medium, on which an image is formed, is a copy sheet or the like. However, the invention is not limited to this. It is possible to adopt any sheet as long as the sheet is a sheet on which it is possible to form an image such as thick paper and an OHP film.

In this embodiment, the functions for carrying out the invention are recorded in the apparatus in advance. However, the invention is not limited to this. The same functions may be downloaded from a network to the apparatus or the same functions stored in a recording medium may be installed in the apparatus. As the recording medium, a form of the recording medium may be any form as long as the recording medium is a recording medium that can store programs and is readable by the apparatus such as a CD-ROM. The functions obtained by installation or download in advance in this way may be realized in cooperation with an OS (Operating System) or the like in the apparatus.

The invention has been explained in detail according to the specific forms. However, it would be obvious for those skilled in the art that various alterations and modifications can be made without departing from the spirit and the scope of the invention.

As described in detail above, according to the invention, it is possible to provide a technique that can perform appropriate image quality control processing corresponding to fluctuation in a printing environment.

What is claimed is:

1. An image forming apparatus comprising:
   a sheet-information acquiring unit configured to acquire information for discriminating a type of a sheet to be an object of image formation processing, by sensing the sheet;
   an operation inputting unit configured to acquire information for discriminating the type of the sheet by receiving an operation input of a user; and
   a control-information acquiring unit configured to acquire, on the basis of the information acquired by the sheet information acquiring unit or the information acquired by the operation inputting unit, information for control used in image quality control processing, if the information for discriminating the type of the sheet is acquired by both of the operation inputting unit and the sheet-information acquiring unit, the control-information acquiring unit acquires, on the basis of the input information acquired by the operation inputting unit prior to the information acquired by the sheet-information acquiring unit, the information for control used in the image quality control processing.

2. An image forming apparatus according to claim 1, if the information acquired by the sheet-information acquiring unit differs from the input information received by the operation inputting unit, the control-information acquiring unit gives priority to the input information received by the operation inputting unit than to the information acquired by the sheet-information acquiring unit.

3. An image forming apparatus according to claim 1, wherein the sheet-information acquiring unit is a media sensor that detects at least one of smoothness of a sheet surface, a reflectance of the sheet surface, an electric resistance of the sheet, thickness of the sheet, and a base color of the sheet.

4. An image forming apparatus according to claim 1, comprising a control-information generating unit configured to generate the information for control on the basis of the information acquired by the sheet-information acquiring unit and predetermined information for generation.

5. An image forming apparatus according to claim 1, wherein the information for control is a table for control, and the control-information acquiring unit acquires a table for control corresponding to the sheet, the information of which is acquired, on the basis of the information acquired by the sheet-information acquiring unit when at least one of smoothness of a surface, a material, and a base color of the sheet, the information of which is acquired, is different from that of a set sheet.

6. An image forming apparatus comprising:
   a sheet-information acquiring unit configured to acquire information for discriminating a type of a sheet to be an object of image formation processing, by sensing the sheet;
   an operation inputting unit configured to acquire information for discriminating the type of the sheet by receiving an operation input of a user; and
   a control-information acquiring unit configured to acquire, on the basis of the information acquired by the sheet-information acquiring unit of the information acquired by the operation inputting unit, information for control used in image quality control processing, even if the input information is acquired by the operation inputting unit, the control-information acquiring unit acquires, on the basis of the information acquired by the sheet-information acquiring unit prior to the input information acquired by the operation inputting unit, the information for control used in the image quality control processing.

7. An image forming apparatus according to claim 6, if the information acquired by the sheet-information acquiring unit differs from the input information received by the operation inputting unit, the control-information acquiring unit gives priority to the information acquired by the sheet-information acquiring unit than to the input information received by the operation inputting unit.

8. An image forming apparatus according to claim 6, wherein the sheet-information acquiring unit is a media sensor that detects at least one of smoothness of a sheet surface, a reflectance of the sheet surface, an electric resistance of the sheet, thickness of the sheet, and a base color of the sheet.

9. An image forming apparatus according to claim 6, comprising a control-information generating unit configured to generate the information for control on the basis of the information acquired by the sheet-information acquiring unit and predetermined information for generation.

10. An image forming apparatus according to claim 6, wherein
    the information for control is a table for control, and
    the control-information acquiring unit acquires a table for control corresponding to the sheet, the information of which is acquired, on the basis of the information acquired by the sheet-information acquiring unit when at least one of smoothness of a surface, a material, and a base color of the sheet, the information of which is acquired, is different from that of a set sheet.

11. An image quality control method comprising:
    acquiring information for discriminating a type of a sheet to be an object of image formation processing, by sensing the sheet;
    acquiring information for discriminating the type of the sheet by receiving an operation input of a user; and
    acquiring, on the basis of acquired information for discriminating a type of a sheet by sensing the sheet or the information acquired by receiving the operation input, information for control used in image quality control processing, if the information for discriminating the type of the sheet is acquired from both sensing the sheet and receiving the operation input, on the basis of the input information acquired by receiving the operation input prior to the information acquired by sensing the sheet, acquiring the information for control used in the image quality control processing.

12. An image quality control method comprising:

acquiring information for discriminating a type of a sheet to be an object of image formation processing, by sensing the sheet;

acquiring information for discriminating the type of the sheet by receiving an operation input of a user; and acquiring, on the basis of acquired information for discriminating a type of a sheet by sensing the sheet or the information acquired by receiving the operation input, information for control used in image quality control processing, even if the information for discriminating the type of the sheet is acquired by receiving the operation input, on the basis of the information acquired by sensing the sheet prior to the input information acquired by receiving the operation input, acquiring the information for control used in the image quality control processing.

* * * * *